UNITED STATES PATENT OFFICE.

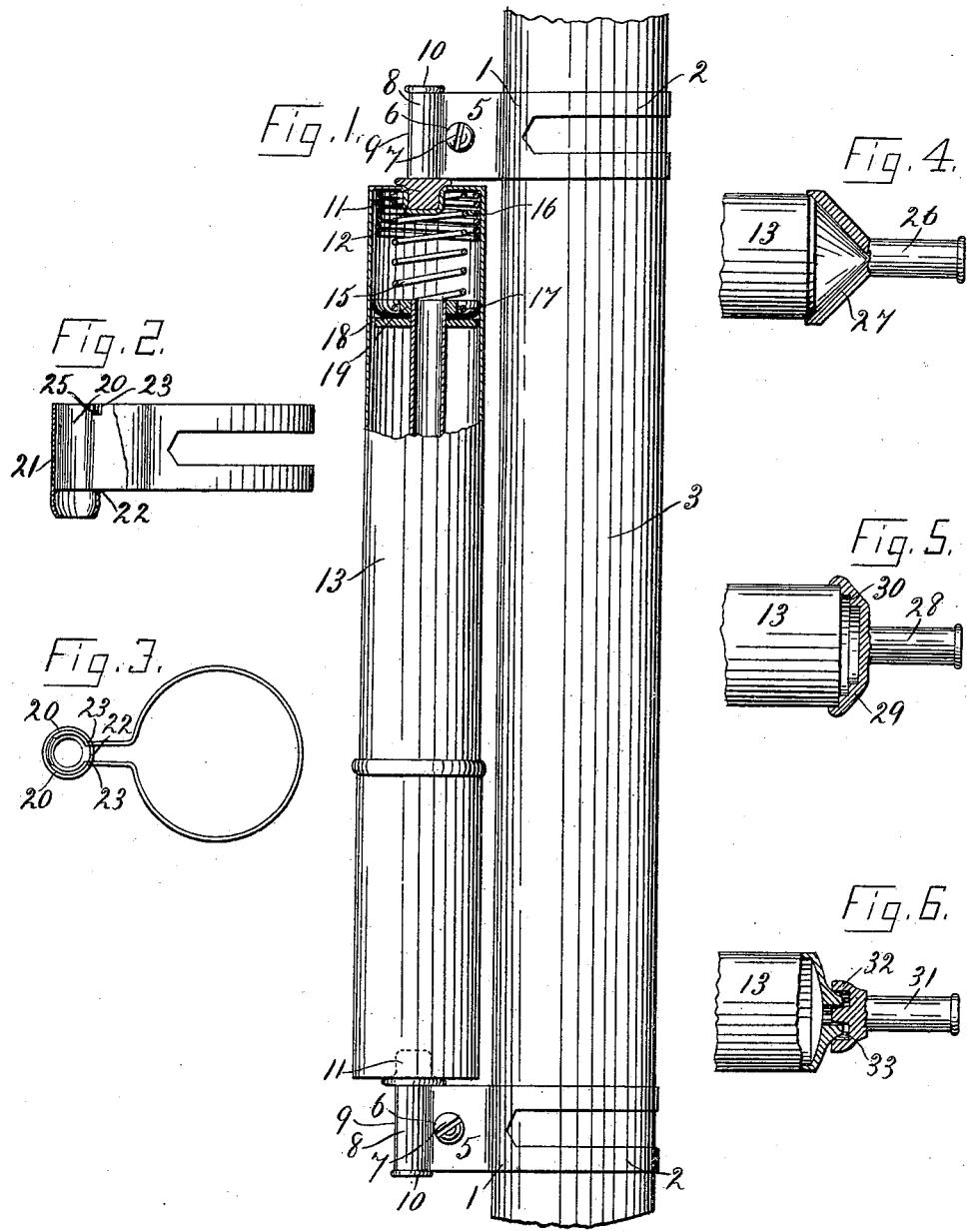

WILLIAM HANLON, OF INNISHANNON, IRELAND.

BICYCLE ATTACHMENT.

SPECIFICATION forming part of Letters Patent No. 620,918, dated March 14, 1899.

Application filed August 23, 1898. Serial No. 689,286. (No model.)

*To all whom it may concern:*

Be it known that I, WILLIAM HANLON, a subject of the Queen of Great Britain, and a resident of Innishannon, county of Cork, Ireland, have invented certain new and useful Improvements in Bicycle Attachments, (for which I have obtained a patent in Great Britain, dated January 29, 1898, No. 2,346, and in Germany, dated June 8, 1898, No. 95,864,) of which the following is a specification, reference being had to the accompanying drawings, forming a part thereof, in which similar figures of reference indicate corresponding parts.

This invention relates to an improvement in bicycle attachments; and the object thereof is to provide a simple and inexpensive device whereby an air-pump to be used for the purpose of inflating the wheel-tires may be quickly attached to the frame of the bicycle, held securely in position thereon, and quickly detached therefrom.

The invention consists, primarily, of the employment of a pair of metallic clips suitably positioned upon one of the tubes of the frame of the machine.

A further feature is the employment of a spring-cushion located between the telescoping members of the pump and adapted to maintain it in secure position between the clips.

The invention will be hereinafter fully described, and specifically set forth in the annexed claims.

In the accompanying drawings, Figure 1 is a side elevation of the device in position upon one of the tubes of a bicycle-frame, a portion of the pump being broken away. Fig. 2 is a side elevation, partially broken away, of a modified form of clip. Fig. 3 is a plan view of the same. Figs. 4, 5, and 6 are modifications of the stud used in connection with the clip.

In the practice of my invention I employ a pair of open-jawed clips or clamps 1 1, which are preferably constructed of resilient metal and have a large circular portion 2, adapted to surround and be clamped upon any convenient tube 3 of the bicycle-frame. Obviously this portion of the clip may be open and may be bifurcated, as shown in Fig. 1, or may be a plain band. The neck portion 5 of the clips is provided with a hole 6, through which the screw 7 passes and which is adapted to clamp the device firmly upon the tube 3. The open jaws 8 of the clips are adapted to clamp the stud 9, which is provided with an enlarged head 10 to prevent longitudinal movement within the jaws of the clip. The preferred form of stud is shown in Fig. 1 and has an enlarged head 11 thereon, adapted to fit in a suitable recess 12 in the ends of the pump 13. This pump 13 is of the well-known type in which one member telescopes within the other.

An open spiral spring 15 is provided at one end thereof with a series of closed coils 16 outside of and concentric with the main body of the spring. This closed coil portion is adapted to fit loosely within the air-cylinder and to rest against the head thereof, while the other end 17 of the open coiled spring rests against the piston-head 18 of the pump and outside of the nut 19, which serves to hold the spring in position.

A modified form of clip is shown in Figs. 2 and 3, in which the jaws 20 20 of the clip are adapted for engagement with the inner side of a tubular stud 21. Said stud has a longitudinal slot 22 open at the top and closed at the bottom and arranged in longitudinal relation with the stud 21. Lugs 23 23, left upon the upper side of the slot, are adapted for engagement with corresponding recesses 25 upon the upper side of the neck of the clip, thus preventing disconnection of the stud from the clip without compressing the latter.

When it is desired to carry a pump the ends of which are not provided with the recess 12, the stud 26, as shown in Fig. 4, is employed in place of that shown in Fig. 1. This stud has a large conical portion 27 of sufficient diameter to embrace the end of the pump 13.

Another modification of stud is shown in Fig. 5, in which the main body of the stud 28 is provided with an enlarged head 29 of approximately conical form, the inner side of which is provided with a series of steps 30, adapted for engagement with the ends of pumps of different diameters.

Still another modification is shown in Fig. 6, in which the stud 31 has a head 32, provided with an annular recess 33. This form of stud is used only in that type of pumps the end of which has a hole therethrough.

In the operation of the device as shown in Fig. 1 the clips 1 1 are secured at proper distances apart upon any convenient tube of the bicycle-frame, the studs 9 9 being clamped in the open jaws of the clip by means of the screws 7 7. The telescopic members of the pump are then separated and the spring 16 placed in position, as shown in Fig. 1. The two members of the pump are then pressed together, thereby compressing the spring 16, and the pump placed in position between the two studs. The action of the spring will hold the pump firmly in position until compressed by the action of the rider in releasing the pump from its engagement with the fixed studs.

When it is desired to use the pump, the two telescoping members thereof are pressed together and the recessed heads of the same released from their engagement with the heads of the stud, the flexible nozzle which when not in use is carried within the cylinder of the pump is screwed on, and the pump is ready for use.

Having thus described my invention, what I claim as new, and desire to secure by Letters Patent, is—

1. An attachment for bicycles embodying a pair of clips fixed to one of the tubes of the frame, studs carried by said clips, said studs having enlarged heads adapted for engagement with the heads of an air-pump, an open spiral spring having an enlarged close-coiled base portion engaging the under side of the cylinder-head of the pump, the opposite end of the spring engaging the piston of the pump, as and for the purpose set forth.

2. An attachment for bicycles, embodying a pair of clips fixed to one of the tubes of the frame, studs carried by said clips, said studs having enlarged heads adapted for engagement with corresponding recesses in the heads of an air-pump, an open spiral spring having an enlarged close-coiled base portion engaging the inner side of the cylinder-head of the pump, the opposite end of the spring engaging the piston of the pump, as and for the purpose set forth.

In testimony that I claim the foregoing as my invention I have signed my name, in presence of two witnesses, this 13th day of August, 1898.

WILLIAM HANLON.

Witnesses:
CHARLES WILLIAMS,
THOMAS MAHONY.